US010129243B2

(12) United States Patent
Yoakum et al.

(10) Patent No.: US 10,129,243 B2
(45) Date of Patent: Nov. 13, 2018

(54) CONTROLLING ACCESS TO TRAVERSAL USING RELAYS AROUND NETWORK ADDRESS TRANSLATION (TURN) SERVERS USING TRUSTED SINGLE-USE CREDENTIALS

(71) Applicant: Avaya Inc., Basking Ridge, NJ (US)

(72) Inventors: John H. Yoakum, Cary, NC (US); Kundan Singh, San Francisco, CA (US); Joel Ezell, Broomfield, CO (US); Alan B. Johnston, St. Louis, MO (US)

(73) Assignee: Avaya Inc., Basking Ridge, NJ (US)

( * ) Notice: Subject to any disclaimer, the term of this patent is extended or adjusted under 35 U.S.C. 154(b) by 114 days.

(21) Appl. No.: 14/141,798

(22) Filed: Dec. 27, 2013

(65) Prior Publication Data

US 2015/0188902 A1     Jul. 2, 2015

(51) Int. Cl.
*H04L 29/06*     (2006.01)
*H04L 29/12*     (2006.01)

(52) U.S. Cl.
CPC ........ *H04L 63/083* (2013.01); *H04L 61/2589* (2013.01)

(58) Field of Classification Search
CPC ... H04L 63/08; H04L 63/083; H04L 63/0281; H04L 63/166; H04L 63/123; H04L 63/101
USPC .......................................................... 726/7
See application file for complete search history.

(56) References Cited

U.S. PATENT DOCUMENTS 6,714,967 B1   3/2004   Horvitz
7,107,316 B2   9/2006   Brown et al.
(Continued)

FOREIGN PATENT DOCUMENTS

| EP | 1615386 A1 | 1/2006 |
|---|---|---|
| EP | 2529316 A2 | 12/2012 |
| GB | 2295747 A | 6/1996 |
| GB | 2468758 A | 9/2010 |

(Continued)

OTHER PUBLICATIONS

Singh, Kundan et al., "Building Communicating Web Applications Leveraging Endpoints and Cloud Resource Service," Presented at the Sixth International Conference on Cloud Computing, Jun. 28, 2013, Santa Clara, California, IEEE Computer Society, pp. 486-493.

(Continued)

*Primary Examiner* — Harunur Rashid
(74) *Attorney, Agent, or Firm* — Sheridan Ross P.C.

(57) ABSTRACT

Embodiments disclosed provide access to Traversal Using Relays around Network Address Translation (TURN) servers using trusted single-use credentials, and related methods, systems, and computer-readable media. In one embodiment, a method comprises receiving, by a TURN authentication agent, a request for a TURN server credential. Responsive to determining that the request is authorized, the agent generates a trusted single-use credential and transmits it to the requestor. Using this trusted single-use credential allows untrusted clients to access a TURN server without exposing a userid/password combination. In another embodiment, a method comprises receiving, by the TURN server, a request for a TURN service. The server challenges the request, and receives a userid and a password. Responsive to determining that the userid and the password constitute a trusted single-use credential and responsive to determining that the request is authorized, the server provides the TURN service for the requestor.

18 Claims, 10 Drawing Sheets

(56) References Cited

U.S. PATENT DOCUMENTS

| | | |
|---|---|---|
| 7,145,898 B1 | 12/2006 | Elliott |
| 7,266,591 B1 | 9/2007 | Johnston |
| 7,379,993 B2 | 5/2008 | Valdes et al. |
| 7,636,348 B2 | 12/2009 | Bettis et al. |
| 7,730,309 B2 | 6/2010 | Zimmermann |
| 8,015,484 B2 | 9/2011 | Backer |
| 8,250,635 B2 | 8/2012 | Chari et al. |
| 8,300,632 B2 | 10/2012 | Davis et al. |
| 8,467,308 B2 | 6/2013 | Johnston |
| 8,494,507 B1 | 7/2013 | Tedesco et al. |
| 8,601,144 B1 | 12/2013 | Ryner |
| 8,605,711 B1 | 12/2013 | Sinnreich et al. |
| 8,606,950 B2 | 12/2013 | Glatron et al. |
| 8,693,392 B2 | 4/2014 | Cooper et al. |
| 8,695,077 B1 | 4/2014 | Gerhard et al. |
| 8,737,596 B2 | 5/2014 | Kelley et al. |
| 8,744,147 B2 | 6/2014 | Torti |
| 8,832,271 B2 | 9/2014 | McCarty |
| 8,856,236 B2 | 10/2014 | Moore et al. |
| 8,861,692 B1 | 10/2014 | Phelps et al. |
| 8,867,731 B2 | 10/2014 | Lum et al. |
| 2002/0161685 A1 | 10/2002 | Dwinnell |
| 2003/0005118 A1* | 1/2003 | Williams ............... H04L 63/08 709/225 |
| 2003/0112766 A1 | 6/2003 | Riedel et al. |
| 2003/0120599 A1 | 6/2003 | Agboatwalla et al. |
| 2003/0131245 A1 | 7/2003 | Linderman |
| 2003/0188193 A1* | 10/2003 | Venkataramappa .......... 713/201 |
| 2004/0019494 A1 | 1/2004 | Ridgeway et al. |
| 2004/0081173 A1 | 4/2004 | Feather |
| 2004/0093515 A1 | 5/2004 | Reeves, Jr. |
| 2004/0167984 A1 | 8/2004 | Herrmann |
| 2004/0216173 A1 | 10/2004 | Horoszowski et al. |
| 2005/0084082 A1 | 4/2005 | Horvitz et al. |
| 2005/0177380 A1 | 8/2005 | Pritchard et al. |
| 2006/0104526 A1 | 5/2006 | Gringeler et al. |
| 2006/0155814 A1 | 7/2006 | Bennett et al. |
| 2006/0159063 A1 | 7/2006 | Kumar |
| 2006/0200855 A1* | 9/2006 | Willis ............................... 726/2 |
| 2006/0230438 A1* | 10/2006 | Shappir ................ G06F 21/335 726/8 |
| 2007/0083929 A1 | 4/2007 | Sprosts et al. |
| 2007/0143408 A1 | 6/2007 | Daigle |
| 2007/0255662 A1 | 11/2007 | Tumminaro |
| 2007/0283423 A1 | 12/2007 | Bradley et al. |
| 2008/0046414 A1 | 2/2008 | Haub et al. |
| 2008/0046457 A1 | 2/2008 | Haub et al. |
| 2008/0046838 A1 | 2/2008 | Haub et al. |
| 2008/0072303 A1* | 3/2008 | Syed ................... H04L 63/0807 726/10 |
| 2008/0127137 A1 | 5/2008 | Becker et al. |
| 2008/0162642 A1 | 7/2008 | Bachiri et al. |
| 2008/0192646 A1 | 8/2008 | Song et al. |
| 2008/0270541 A1 | 10/2008 | Keener et al. |
| 2009/0070477 A1 | 3/2009 | Baum et al. |
| 2009/0094684 A1* | 4/2009 | Chinnusamy et al. ............ 726/4 |
| 2009/0235339 A1* | 9/2009 | Mennes ................. G06F 21/33 726/5 |
| 2009/0300060 A1 | 12/2009 | Beringer et al. |
| 2010/0011282 A1 | 1/2010 | Dollard et al. |
| 2010/0023519 A1 | 1/2010 | Kailash et al. |
| 2010/0024019 A1 | 1/2010 | Backlund |
| 2010/0037324 A1 | 2/2010 | Grant et al. |
| 2010/0118700 A1 | 5/2010 | Blum et al. |
| 2010/0246571 A1 | 9/2010 | Geppert et al. |
| 2011/0102930 A1 | 5/2011 | Johnston et al. |
| 2011/0206013 A1 | 8/2011 | Aramoto et al. |
| 2011/0238862 A1 | 9/2011 | Chaturvedi et al. |
| 2012/0001932 A1 | 1/2012 | Burnett et al. |
| 2012/0079031 A1 | 3/2012 | Matthews et al. |
| 2012/0137231 A1 | 5/2012 | Maxfield et al. |
| 2012/0158862 A1 | 6/2012 | Mosko et al. |
| 2012/0192086 A1 | 7/2012 | Ghods et al. |
| 2013/0002799 A1 | 1/2013 | Mock |
| 2013/0078972 A1 | 3/2013 | Levien et al. |
| 2013/0091286 A1 | 4/2013 | Spencer |
| 2013/0138829 A1 | 5/2013 | Bulava |
| 2013/0321340 A1 | 12/2013 | Seo et al. |
| 2013/0325934 A1 | 12/2013 | Fausak et al. |
| 2013/0346329 A1 | 12/2013 | Alib-Bulatao et al. |
| 2014/0013202 A1 | 1/2014 | Schlumberger |
| 2014/0043994 A1 | 2/2014 | Bansal et al. |
| 2014/0095633 A1 | 4/2014 | Yoakum |
| 2014/0095724 A1 | 4/2014 | Yoakum et al. |
| 2014/0095731 A1 | 4/2014 | Carey et al. |
| 2014/0108594 A1 | 4/2014 | Siegel et al. |
| 2014/0126708 A1 | 5/2014 | Sayko |
| 2014/0126714 A1 | 5/2014 | Sayko |
| 2014/0126715 A1 | 5/2014 | Lum et al. |
| 2014/0143823 A1 | 5/2014 | Manchester et al. |
| 2014/0149512 A1 | 5/2014 | Leitch |
| 2014/0161237 A1 | 6/2014 | Tolksdorf |
| 2014/0177821 A1* | 6/2014 | Ristock .............. G06Q 10/0631 379/266.08 |
| 2014/0201820 A1 | 7/2014 | Li et al. |
| 2014/0219167 A1 | 8/2014 | Santhanam et al. |
| 2014/0222930 A1 | 8/2014 | Gangadharan et al. |
| 2014/0223452 A1 | 8/2014 | Santhanam et al. |
| 2014/0237057 A1 | 8/2014 | Khodorenko |
| 2014/0241215 A1 | 8/2014 | Massover et al. |
| 2014/0244235 A1 | 8/2014 | Michaelis |
| 2014/0245143 A1 | 8/2014 | Saint-Marc |
| 2014/0772894 | 8/2014 | Gangadharan et al. |
| 2014/0258822 A1 | 9/2014 | Li et al. |
| 2014/0269326 A1 | 9/2014 | Westin et al. |
| 2014/0270104 A1 | 9/2014 | O'Connor |
| 2014/0280734 A1 | 9/2014 | Chaturvedi et al. |
| 2014/0282054 A1 | 9/2014 | Yoakum |
| 2014/0282135 A1 | 9/2014 | Segre |
| 2014/0282399 A1 | 9/2014 | Gorelik et al. |
| 2014/0282765 A1 | 9/2014 | Casey et al. |
| 2014/0282903 A1 | 9/2014 | Singh et al. |
| 2014/0324979 A1 | 10/2014 | Gao et al. |
| 2014/0325078 A1 | 10/2014 | Shan et al. |
| 2014/0344169 A1 | 11/2014 | Phelps et al. |
| 2014/0348044 A1 | 11/2014 | Narayanan et al. |
| 2014/0365676 A1 | 12/2014 | Yoakum |
| 2014/0379931 A1 | 12/2014 | Gaviria |
| 2015/0002614 A1 | 1/2015 | Zino et al. |
| 2015/0002619 A1 | 1/2015 | Johnston et al. |
| 2015/0006610 A1 | 1/2015 | Johnston et al. |
| 2015/0006611 A1 | 1/2015 | Johnston et al. |
| 2015/0026473 A1 | 1/2015 | Johnston et al. |
| 2015/0036690 A1* | 2/2015 | Pastro ........................... 370/401 |
| 2015/0039687 A1 | 2/2015 | Waxman et al. |
| 2015/0039760 A1 | 2/2015 | Yoakum |
| 2015/0052067 A1 | 2/2015 | Thiyagarajan et al. |
| 2015/0142879 A1* | 5/2015 | Rameil-Green ........ H04L 41/28 709/203 |
| 2015/0180825 A1 | 6/2015 | Ren et al. |

FOREIGN PATENT DOCUMENTS

| | | | |
|---|---|---|---|
| GB | 2468759 A | 9/2010 | |
| GB | 2517833 A | 3/2015 | |
| JP | 2002207683 A | 7/2002 | |
| JP | 2002374318 A | 12/2002 | |
| JP | 2005346556 A | 12/2005 | |
| JP | 2006050407 A | 2/2006 | |
| JP | 2011504665 A | 2/2011 | |
| WO | WO 01/72009 A2 * | 9/2001 | ............ H04L 29/06 |
| WO | WO 02/39237 A2 * | 5/2002 | ............ H04L 29/06 |
| WO | 2014060008 A1 | 4/2014 | |
| WO | 2014123738 A1 | 8/2014 | |
| WO | 2014190094 A1 | 11/2014 | |
| WO | 2015032277 A1 | 3/2015 | |

OTHER PUBLICATIONS

Singh, Kundan et al., "Private Overlay of Enterprise Social Data and Interactions in the Public Web Context," presented at the 9th IEEE International Conference on Collaborative Computing: Networking,

(56) References Cited

OTHER PUBLICATIONS

Applications and Worksharing (Collaboratecom), Oct. 20-23, 2013, Austin, Texas, IEEE, 10 pages.
Berners-Lee, Tim, "Socially Aware Cloud Storage," Notes on web design, Aug. 17, 2009, http://www.w3.org/DesignIssues/CloudStorage.html, 9 pages.
Chandra, Ramesh et al., "Separating Web Applications from User Data Storage with BStore," presented at the USENIX Conference on Web Application Development, Jun. 2010, Boston, Massachusetts, 13 pages.
Davids, Carol et al., "SIP APIs for Voice and Video Communications on the Web," presented at the International Conference on Principles, Systems and Applications of IP Telecommunications (IPTcomm), Aug. 2011, Chicago, Illinois, 7 pages.
Geambasu, Roxana et al., "Organizing and Sharing Distributed Personal Web-Service Data," presented at the International World Wide Web Conference, Apr. 21-25, 2008, Beijing, China, International World Wide Web Conference Committee, pp. 755-764.
Hsu, F. et al., "Secure File System Services for Web 2.0 Applications," presented at the ACM Cloud Computing Security Workshop, Nov. 13, 2009, Chicago, Illinois, Association for Computing Machinery, 7 pages.
Joshi, R., "Data-Oriented Architecture: A Loosley Coupled Real-Time SOA," Whitepaper, Aug. 2007, Real-Time Innovations, Inc., http://rtcgroup.com/whitepapers/files/RTI_DataOrientedArchitecture_WhitePaper.pdf, 54 pages.
Vahdat, Amin et al., "WebFS: A Global Cache Coherent File System," UC Berkeley, Dec. 1996, retrieved Sep. 16, 2014 from https://www.cs.duke.edu/~vandat/webfs/webfs.html, 12 pages.
Non-Final Office Action for U.S. Appl. No. 14/037,440, dated Sep. 12, 2014, 15 pages.
Andreasen et al., "Session Description Protocol (SDP): Security Descriptions for Media Streams," Network Working Group, Request for Comments: 4568, Standards Track, The Internet Society, Jul. 2006, 40 pages.
Baugher et al., "The Secure Real-time Transport Protocol (SRTP)," Network Working Group, Request for Comments: 3711, Standards Track, The Internet Society, Mar. 2004, 51 pages.
Johnston et al., "WebRTC: APIs and RTCWEB Protocols of the HTML5 Real-Time Web," (Book), Second Edition, Smashwords Edition, Digital Codex LLC, Jun. 2013, 254 pages.
Mahy et al., "Traversal Using Relays around NAT (TURN) : Relay Extensions to Session Traversal Utilities for NAT (STUN)," Internet Engineering Task Force, Request for Comments: 5766, Standards Track, IETF Trust, Apr. 2010, 61 pages.
McGrew et al., "Datagram Transport Layer Security (DTLS) Extension to Establish Keys for the Secure Real-Time Transport Protocol (SRTP)," Internet Engineering Task Force, Request for Comments: 5764, Standards Track, IETF Trust, May 2010, 24 pages.
Zimmermann et al., "ZRTP: Media Path Key Agreement for Unicast Secure RTP," Internet Engineering Task Force, Request for Comments: 6189, Informational, IETF Trust, Apr. 2011, 102 pages.
Notice of Allowance for U.S. Appl. No. 13/931,968, dated Mar. 23, 2015, 7 pages.
Final Office Action for U.S. Appl. No. 13/835,913, dated Mar. 26, 2015, 17 pages.
Final Office Action for U.S. Appl. No. 14/037,440, dated Feb. 11, 2015, 19 pages.
Non-Final Office Action for U.S. Appl. No. 14/068,839, dated Feb. 20, 2015, 15 pages.
Johnston, Alan et al., "Taking on WebRTC in an Enterprise," IEEE Communications Magazine, Apr. 2013, pp. 48-54, vol. 51, Issue 4.
Search Report for British patent application GB1317121.0 dated Mar. 14, 2014, 3 pages.
Search Report for British patent application GB1317122.8 dated Mar. 11, 2014, 3 pages.
Barth, A. "The Web Origin Concept," Internet Engineering Task Force (IETF), Request for Comments 6454 (RFC 6454), Dec. 2011, 19 pages, http://www.ietf.org/rfc/rfc6454.txt.
Fischl, J. et al., "Framework for Establishing a Secure Real-time Transport Protocol (SRTP) Security Context Using Datagram Transport Layer Security (DTLS)," Internet Engineering Task Force (IETF), Request for Comments (RFC) 5763, May 2010, 26 pages.
Jesup, R. et al., "DTLS Encapsulation of SCTP Packets for RTCWEB," IETF: Network Working Group, Internet Draft, Feb. 16, 2013, 6 pages.
Johnston, A. et al., "An Origin Attribute for the STUN Protocol," Internet Engineering Task Force (IETF), Internet-Draft, Jul. 20, 2014, 14 pages, https://tools.ietf.org/html/draft-ietf-tram-stun-origin-00.
Rescorla, E., "Security Considerations for RTC-Web," IETF RTCWEB, Internet Draft, Jan. 22, 2013, 16 pages.
Rescorla, E., "WebRTC Security Architecture," IETF RTCWEB, Internet Draft, Jul. 14, 2013, 30 pages.
Corrected Notice of Allowability for U.S. Appl. No. 13/931,968, dated Apr. 24, 2015, 4 pages.
Advisory Action for U.S. Appl. No. 14/037,440, dated May 20, 2015, 3 pages.
Search Report for British Patent Application GB1419338.7, dated Apr. 27, 2015, 4 pages.
Search Report for British Patent Application GB1419334.6, dated Apr. 28, 2015, 6 pages.
Notice of Allowance for U.S. Appl. No. 13/944,368, dated Apr. 1, 2015, 8 pages.
Non-Final Office Action for U.S. Appl. No. 13/931,967, dated May 5, 2015, 10 pages.
Non-Final Office Action for U.S. Appl. No. 13/931,970, dated May 7, 2015, 9 pages.
U.S. Appl. No. 13/803,292, filed Mar. 14, 2013.
U.S. Appl. No. 13/863,662, filed Apr. 16, 2013.
U.S. Appl. No. 13/835,913, filed Mar. 15, 2013.
U.S. Appl. No. 13/912,520, filed Jun. 7, 2013.
U.S. Appl. No. 13/955,711, filed Jul. 31, 2013.
U.S. Appl. No. 13/944,368, filed Jul. 17, 2013.
U.S. Appl. No. 13/931,967, filed Jun. 30, 2013.
U.S. Appl. No. 13/931,968, filed Jun. 30, 2013.
U.S. Appl. No. 13/931,970, filed Jun. 30, 2013.
U.S. Appl. No. 13/955,023, filed Jul. 31, 2013.
U.S. Appl. No. 14/071,896, filed Nov. 5, 2013.
U.S. Appl. No. 14/050,891, filed Oct. 10, 2013.
U.S. Appl. No. 14/037,440, filed Sep. 26, 2013.
U.S. Appl. No. 14/174,371, filed Feb. 6, 2014.
U.S. Appl. No. 14/068,943, filed Oct. 31, 2013.
U.S. Appl. No. 14/255,361, filed Apr. 17, 2014.
U.S. Appl. No. 14/068,839, filed Oct. 31, 2013.
U.S. Appl. No. 14/313,041, filed Jun. 24, 2014.
U.S. Appl. No. 14/255,429, filed Apr. 17, 2014.
Bergkvist, Adam et al., "WebRTC 1.0: Real-time Communication Between Browsers," W3C Working Draft, Feb. 9, 2012, http://www.w3.org/TR/2012/WD-webrtc-20120209/, 42 pages.
Notice of Reason for Refusal for Japanese Patent Application 2013-201228, dated Jun. 11, 2015, 8 pages.
Extended European Search Report for European Patent Application 15161452.6, dated Jun. 23, 2015, 5 pages.
Advisory Action for U.S. Appl. No. 13/835,913, dated Jun. 10, 2015, 3 pages.
Final Office Action for U.S. Appl. No. 13/803,292, dated Jun. 12, 2015, 17 pages.
Final Office Action and Examiner Initiated Interview Summary for U.S. Appl. No. 14/050,891, dated Jun. 29, 2015, 11 pages.
Final Office Action for U.S. Appl. No. 13/955,023, dated Jul. 20, 2015, 17 pages.
Corrected Notice of Allowability for U.S. Appl. No. 13/944,368, dated Jul. 23, 2015, 4 pages.
Rodriguez, Pedro et al., "Advanced Videoconferencing Services Based on WebRTC," IADIS International Conferences Web Based Communities and Social Media 2012 and Collaborative Technologies 2012, Jul. 17-23, 2012, pp. 180-184, http://www.iadisportal.org/wbc-2012-proceedings.
Non-Final Office Action for U.S. Appl. No. 13/835,913, dated Sep. 3, 2015, 19 pages.

(56) References Cited

OTHER PUBLICATIONS

Non-Final Office Action for U.S. Appl. No. 13/912,520, dated Sep. 9, 2015, 21 pages.
Non-Final Office Action for U.S. Appl. No. 13/863,662, dated Sep. 25, 2015, 23 pages.
Advisory Action for U.S. Appl. No. 13/803,292, dated Aug. 21, 2015, 3 pages.
Non-Final Office Action for U.S. Appl. No. 13/803,292, dated Oct. 9, 2015, 13 pages.
Advisory Action and Examiner-Initiated Interview Summary for U.S. Appl. No. 14/050,891, dated Sep. 29, 2015, 4 pages.
Final Office Action for U.S. Appl. No. 14/068,839, dated Sep. 9, 2015, 17 pages.
Final Office Action for U.S. Appl. No. 13/931,967, dated Aug. 20, 2015, 12 pages.
Final Office Action for U.S. Appl. No. 13/931,970, dated Aug. 27, 2015, 10 pages.
Examination Report for British Patent Application GB1411584.4, dated Aug. 21, 2015, 1 page.
Examination Report for British Patent Application GB1411580.2, dated Aug. 21, 2015, 1 page.
Notification of Reasons for Refusal for Japanese Patent Application 2013-201221, dated Aug. 25, 2015, 8 pages.
Search Report for United Kingdom Patent Application No. GB1423089.0, dated Jul. 6, 2015 4 pages.
Author Unknown, "WebRTC," WebRTC.org, Date Accessed: Jan. 26, 2016, 4 pages, http://webrtc.org/.
Notice of Allowance for U.S. Appl. No. 13/863,662, dated Feb. 1, 2016, 17 pages.
Advisory Action and Examiner-Initiated Interview Summary for U.S. Appl. No. 14/068,839, dated Feb. 12, 2016, 4 pages.
Non-Final Office Action for U.S. Appl. No. 14/174,371, dated Feb. 18, 2016, 18 pages.
Non-Final Office Action for U.S. Appl. No. 13/931,970, dated Feb. 23, 2016, 11 pages.
Loreto, Salvatore et al., "Real-Time Communications in the Web: Issues, Achievements, and Ongoing Standardization Efforts," IEEE Internet Computing, vol. 16, Issue 5, IEEE Computer Society, Oct. 2, 2012, pp. 68-73.
Search Report for British patent application GB1411584.4 dated Dec. 30, 2014, 4 pages.
Search Report for British patent application GB1411580.2 dated Dec. 30, 2014, 4 pages.
Non-Final Office Action for U.S. Appl. No. 13/931,968, dated Dec. 8, 2014, 6 pages.
Non-Final Office Action for U.S. Appl. No. 13/835,913, dated Nov. 20, 2014, 15 pages.
Non-Final Office Action for U.S. Appl. No. 13/803,292, dated Jan. 27, 2015, 13 pages.
Non-Final Office Action for U.S. Appl. No. 14/050,891, dated Jan. 29, 2015, 9 pages.
Non-Final Office Action for U.S. Appl. No. 13/955,023, dated Feb. 2, 2015, 12 pages.
Non-Final Office Action for U.S. Appl. No. 13/955,711, dated Nov. 9, 2015, 10 pages.
Notice of Allowance for U.S. Appl. No. 14/050,891, dated Nov. 10, 2015, 10 pages.
Non-Final Office Action for U.S. Appl. No. 13/955,023, dated Dec. 9, 2015, 13 pages.
Non-Final Office Action for U.S. Appl. No. 14/037,440, dated Oct. 22, 2015, 15 pages.
Advisory Action for U.S. Appl. No. 13/931,967, dated Nov. 3, 2015, 3 pages.
Advisory Action for U.S. Appl. No. 13/931,970, dated Nov. 5, 2015, 3 pages.
Non-Final Office Action for U.S. Appl. No. 14/068,943, dated Dec. 2, 2015, 16 pages.
Non-Final Office Action for U.S. Appl. No. 14/255,429, dated Nov. 9, 2015, 26 pages.

* cited by examiner

CONTROLLING ACCESS TO TRAVERSAL USING RELAYS AROUND NETWORK ADDRESS TRANSLATION (TURN) SERVERS USING TRUSTED SINGLE-USE CREDENTIALS

BACKGROUND

Field of the Disclosure

The technology of the disclosure relates to Network Address Translation (NAT) generally, and controlling access to a Traversal Using Relays around NAT (TURN) server in particular.

Technical Background

In some circumstances, it may be desirable for two computers to directly communicate with one another. As non-limiting examples, such direct communications may be for purposes of file sharing or communicating with text, voice, and/or video. Direct connections may increase connection speed, thus facilitating real-time communications. For example, Web Real-Time Communications (WebRTC) enables browser-to-browser applications that may employ direct connections for voice calling, video chat, and peer-to-peer (P2P) file sharing.

In many cases, such direct communications are impeded by the use of a Network Address Translation (NAT) system or a firewall system between the two computers. These systems can prevent communications attempts into a network that they protect, such as an enterprise network. A solution to this problem is a Traversal Using Relays around NAT (TURN) server, which may allow for a client behind a NAT or firewall to receive incoming data. The TURN server may act as a relay node and may accept connections to the client. All incoming communications for the connection travel through the TURN server, which relays the communications to the client.

Although the TURN server can be used to traverse around NAT or firewall systems, the use of a TURN server may create its own problems. For instance, using a TURN server may yield a relatively high consumption of both network bandwidth and computing resources. As a result, it may be necessary to control access to the TURN server by, for example, requiring a TURN client to provide a userid/password combination. However, requiring a userid/password combination may limit usability of the TURN server by restricting access only to trusted TURN clients, and/or may expose userid/password combinations to non-trusted users in a manner that may be maliciously exploited.

SUMMARY OF THE DETAILED DESCRIPTION

Embodiments disclosed in the detailed description provide controlling access to Traversal Using Relays around Network Address Translation (TURN) servers using trusted single-use credentials, and related methods, systems, and computer-readable media. In this regard, in one embodiment, a method for controlling access to TURN servers is provided. The method comprises receiving, by a TURN authentication agent executing on a computing device, a request for a TURN server credential from a requestor. The method further comprises determining whether to authorize the request for the TURN server credential. The method additionally comprises, responsive to determining that the request is authorized, generating a trusted single-use credential, and transmitting the trusted single-use credential to the requestor. In some embodiments, the trusted single-use credential may be used to access the TURN server. In this manner, the trusted single-use credential allows access to the TURN server to be granted to clients that might not be completely trusted, without exposing a userid/password combination that might be misused.

In another embodiment, a method for providing access to TURN servers is provided. The method comprises receiving, by a TURN server executing on a computing device, a request for a TURN service from a requestor. The method also comprises challenging the request for the TURN service and receiving a userid and a password from the requestor. The method additionally comprises determining, based on the userid, whether the userid and the password constitute a trusted single-use credential. The method also comprises, responsive to determining that the userid and the password constitute the trusted single-use credential, determining whether to authorize the request for the TURN service. The method further comprises, responsive to determining that the request is authorized, providing the TURN service for the requestor.

In another embodiment, a system for controlling access to TURN servers is provided. The system comprises a TURN authentication agent executing on a computing device. The TURN authentication agent comprises a communications interface configured to communicate with a requestor. The TURN authentication agent is configured to receive a request for a TURN server credential from the requestor and to determine whether to authorize the request for the TURN server credential. The TURN authentication agent is additionally configured to, responsive to determining that the request is authorized, generate a trusted single-use credential, and transmit the trusted single-use credential to the requestor.

In another embodiment, a system for providing access to TURN servers is provided. The system comprises a TURN server executing on a computing device. The TURN server comprises a communications interface configured to communicate with a requestor. The TURN server is configured to receive a request for a TURN service from the requestor and to challenge the request for the TURN service. The TURN server is further configured to receive a userid and a password from the requestor. The TURN server is additionally configured to determine, based on the userid, whether the userid and the password constitute a trusted single-use credential. The TURN server is also configured to, responsive to determining that the userid and the password constitute the trusted single-use credential, determine whether to authorize the request for the TURN service. The TURN server is further configured to, responsive to determining that the request is authorized, provide the TURN service for the requestor.

In another embodiment, a non-transitory computer-readable medium stores one or more programs. The one or more programs comprise instructions, which when executed by an electronic device cause the electronic device to implement a method for controlling access to TURN servers. The method implemented by the instructions comprises receiving, by a TURN authentication agent, a request for a TURN server credential from a requestor. The method implemented by the instructions additionally comprises determining whether to authorize the request for the TURN server credential. The method implemented by the instructions also comprises, responsive to determining that the request is authorized, generating a trusted single-use credential, and transmitting the trusted single-use credential to the requestor.

In another embodiment, a non-transitory computer-readable medium stores one or more programs. The one or more programs comprise instructions, which when executed by an electronic device cause the electronic device to implement a method for providing access to TURN servers. The method implemented by the instructions comprises receiving, by a TURN server, a request for a TURN service from a requestor and challenging the request for the TURN service. The method implemented by the instructions additionally comprises receiving a userid and a password from the requestor. The method implemented by the instructions also comprises determining, based on the userid, whether the userid and the password constitute a trusted single-use credential. The method implemented by the instructions further comprises, responsive to determining that the userid and the password constitute the trusted single-use credential, determining whether to authorize the request for the TURN service. The method implemented by the instructions additionally comprises, responsive to determining that the request is authorized, providing the TURN service for the requestor.

BRIEF DESCRIPTION OF THE FIGURES

The accompanying drawing figures incorporated in and forming a part of this specification illustrate several aspects of the disclosure, and together with the description serve to explain the principles of the disclosure.

DETAILED DESCRIPTION

Figure 1:
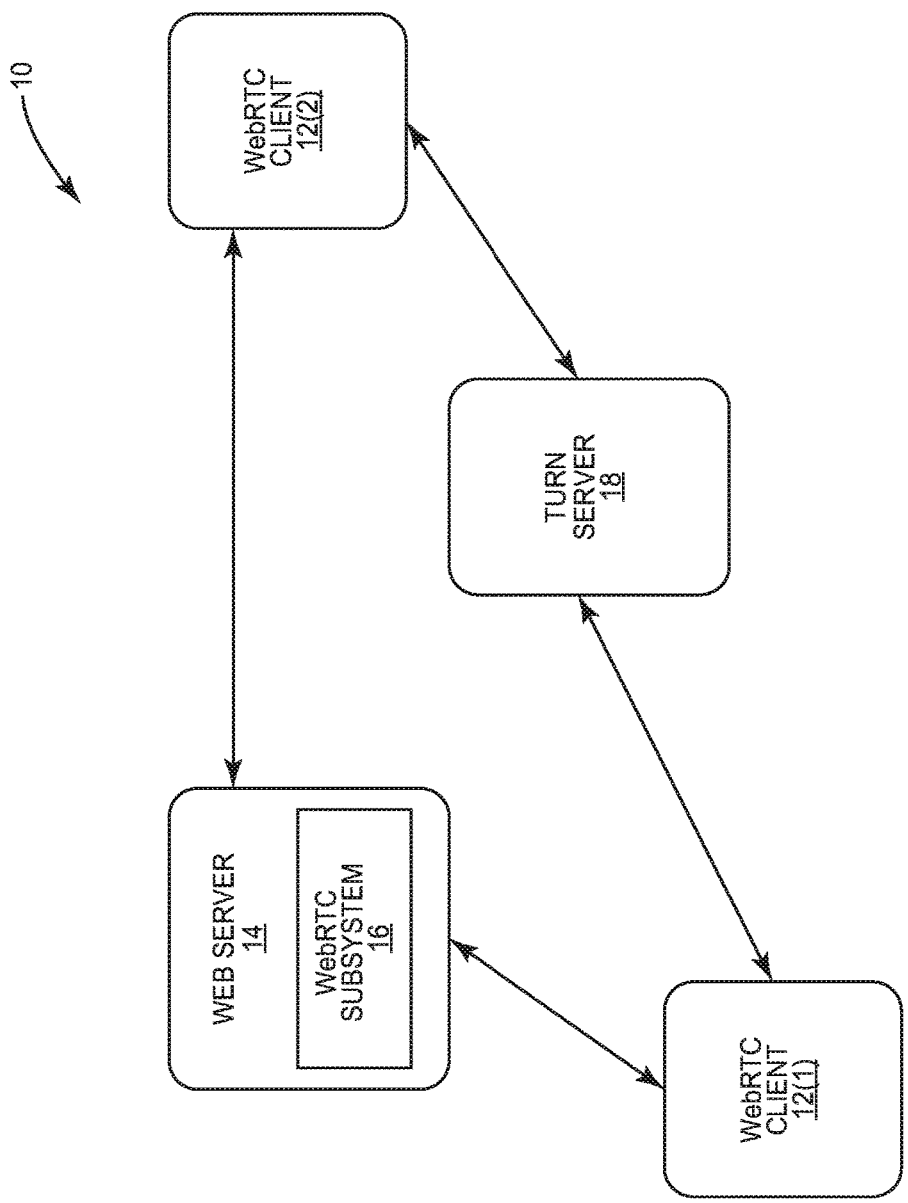
FIG. 1 is a block diagram of an exemplary Traversal Using Relays around Network Address Translation (TURN) server system with a web server that provides a Web Real-Time Communications (WebRTC) subsystem.

With reference now to the drawing figures, several exemplary embodiments of the present disclosure are described.

The word "exemplary" is used herein to mean "serving as an example, instance, or illustration." Any embodiment described herein as "exemplary" is not necessarily to be construed as preferred or advantageous over other embodiments.

Embodiments disclosed in the detailed description provide controlling access to Traversal Using Relays around Network Address Translation (TURN) servers using trusted single-use credentials, and related methods, systems, and computer-readable media. In this regard, in one embodiment, a method for controlling access to TURN servers is provided. The method comprises receiving, by a TURN authentication agent executing on a computing device, a request for a TURN server credential from a requestor. The method further comprises determining whether to authorize the request for the TURN server credential. The method additionally comprises, responsive to determining that the request is authorized, generating a trusted single-use credential, and transmitting the trusted single-use credential to the requestor. In some embodiments, the trusted single-use credential may be used to access the TURN server. In this manner, the trusted single-use credential allows access to the TURN server to be granted to clients that might not be completely trusted, without exposing a userid/password combination that might be misused.

In another embodiment, a method for providing access to TURN servers is provided. The method comprises receiving, by a TURN server executing on a computing device, a request for a TURN service from a requestor. The method also comprises challenging the request for the TURN service and receiving a userid and a password from the requestor. The method additionally comprises determining, based on the userid, whether the userid and the password constitute a trusted single-use credential. The method also comprises, responsive to determining that the userid and the password constitute the trusted single-use credential, determining whether to authorize the request for the TURN service. The method further comprises, responsive to determining that the request is authorized, providing the TURN service for the requestor.

Before discussing access control for TURN servers using trusted single-use credentials as disclosed herein, operations of an exemplary TURN server system are described. In this regard, an exemplary TURN server system 10 is shown in FIG. 1. As illustrated in FIG. 1, two Web Real-Time Communications (WebRTC) clients 12(1) and 12(2) can communicate with a web server 14 that provides a WebRTC subsystem 16. The WebRTC subsystem 16 enables the WebRTC clients 12 to coordinate communications parameters, such as network addresses or preferred encryption techniques, during initiation of a WebRTC session. When an obstacle, such as a Network Address Translation (NAT) system or a firewall, impedes the ability of the WebRTC client 12(1) to connect directly to the WebRTC client 12(2), the WebRTC client 12(1) may use a TURN server 18 to facilitate the communications. The TURN server 18 relays the communications between the WebRTC clients 12, thereby traversing the NAT system, the firewall, or another impediment to direct connection.

Due to the demands of relaying the communications, the use of the TURN server 18 may require a relatively high amount of both bandwidth and processing power. All communications from the WebRTC client 12(1) have to both be received by the TURN server 18 and transmitted by the TURN server 18. The same may be true for all communications from the WebRTC client 12(2). The required bandwidth for the TURN server 18 thus may be equal to the sum of the bandwidth used by the WebRTC clients 12(1) and 12(2). The required processing power of the TURN server 18 is also high because of the high bandwidth requirement. This is because all communications must at least be processed to determine the correct relay destination, and may also be processed to determine if the communications are allowed to be relayed based on various permissions.

Because of the relatively high amount of bandwidth and processing power required, the TURN server 18 may be more expensive to operate than other servers. This expense may come from the cost to purchase and maintain the hardware and/or the cost of operating the TURN server 18 in terms of energy consumed and bandwidth used. Because of this expense, the owner of the TURN server 18 may not have a financial model that allows for making the TURN server 18 open to use by members of the public.

Additionally, the high resource use of the TURN server 18 may make it an easy target for a denial-of-service attack. In a denial-of-service attack, malicious users gain access to the TURN server 18 and attempt to use most or all of the bandwidth or processing power of the TURN server 18. While these resources are being consumed, legitimate users of the TURN server 18 may be denied service because there are not enough remaining resources.

Because of the expense and potential for malicious activity, the TURN server 18 may be secured to prevent denial of service attacks or other unauthorized use. The standards included in Request for Comments (RFC) 5766 (available online at, e.g., http://tools.ietf.org/search/rfc5766) recommend that access be protected with a userid/password digest authentication. Accordingly, each WebRTC client 12 behind a NAT system or firewall seeking to make a direct connection with another WebRTC client 12 must access the TURN server 18 using a userid and password. In cases where a WebRTC client 12 is trusted, a static userid and password, which can be used multiple times and may possibly be used to receive different TURN services from the TURN server 18, can be assigned to the WebRTC client 12. When the WebRTC client 12 is executing on a private computer that is unknown to the operators of the TURN server 18, the WebRTC client 12 might not be trusted. If the WebRTC client 12 is not trusted, the WebRTC client 12 should not be given a static userid and password because it might be misused as previously discussed. However, there may be instances where the operators of the TURN server 18 decide to provide access for a potentially untrusted requestor.

Figure 2:
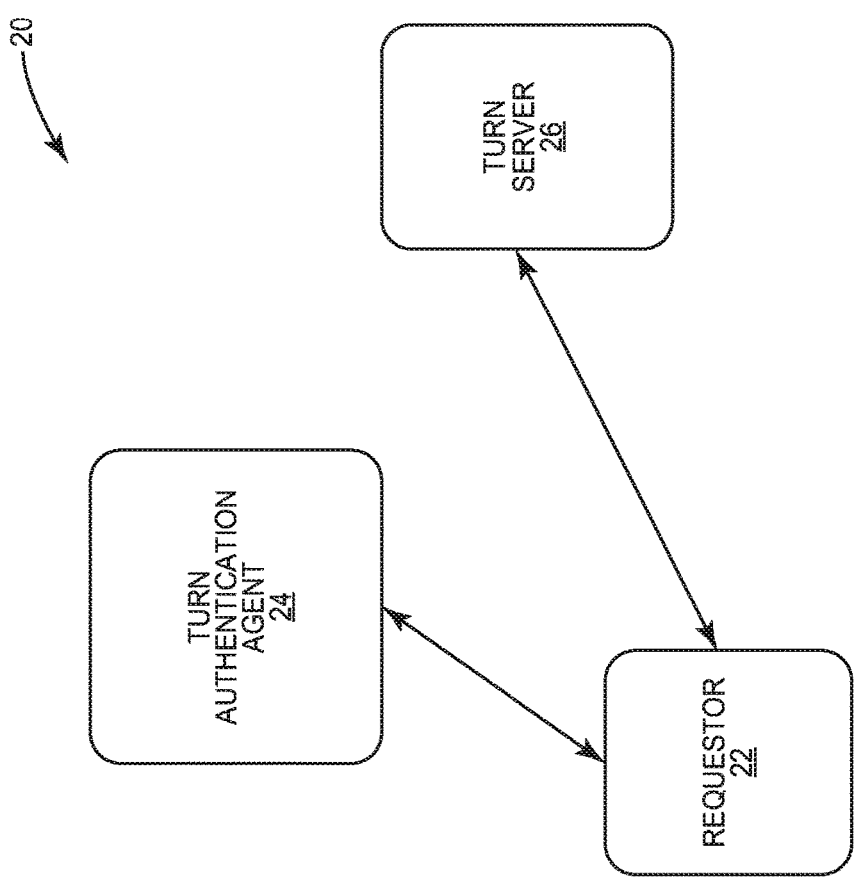
FIG. 2 is a block diagram of an exemplary TURN server authentication system including a TURN authentication agent and a TURN server.

In this regard, FIG. 2 is a block diagram illustrating a TURN server authentication system 20 for providing access control to TURN servers using trusted single-use credentials as disclosed herein. In this exemplary TURN server authentication system 20, a requestor 22 requests a TURN server credential (not shown) from a TURN authentication agent 24. The requestor 22 is any entity that needs to access a TURN server 26. According to some embodiments, the TURN authentication agent 24 has some trusted relationship with the TURN server 26 such that the TURN authentication agent 24 can authenticate the requestor 22 and allow the requestor 22 to access the TURN server 26. After determining that the requestor 22 is authorized, the TURN authentication agent 24 transmits a trusted single-use credential (not shown) to the requestor 22. This process will be discussed in more detail below in regard to FIGS. 3 and 5. The requestor 22 can now use this trusted single-use credential to obtain a TURN service from the TURN server 26. This process will be discussed in more detail below in regard to FIGS. 4 and 6.

According to some embodiments, this trusted single-use credential comprises an authentication token. The authentication token may include values such as a domain address, an expiration time stamp, a nonce value, a signature, and/or enterprise policy instructions as non-limiting examples. The domain address that may be included in the trusted single-use credential may be used to identify the authorized domain for the use of the TURN server 26. In some embodiments, this domain address may also be used as a userid in the processes described below in relation to FIGS. 5 and 6. The expiration time stamp may be used to define how long the authentication token will be valid. Using a sufficiently small time duration may prevent, or at least hinder, the misuse of the authentication token by making the authentication token invalid after the expiration time stamp.

The nonce value of the trusted single-use credential can be a truly random number or a sufficiently pseudorandom number to ensure a low probability of repeating the value. The use of this nonce value ensures that the authentication token is unique. This can protect against the use of the authentication token in a replay attack, or similar misuse where the same authentication token is used multiple times by the same or multiple parties. In some embodiments, a list of processed nonce values can be maintained, and may include all nonce values or only the values received within a limited timeframe. If the same nonce value is encountered again, the request may be denied or silently discarded.

The signature that may be included in the authentication token may attest to the identity of the signer. In some embodiments, the signature is produced by the TURN authentication agent 24 by encrypting some other piece of information. This encryption may be accomplished with a symmetric encryption scheme such as using a shared secret. In a symmetric encryption scheme, the same key may be used for both encryption and decryption. The encryption may also be accomplished through an asymmetric encryption scheme, such as Public-Key Infrastructure (PKI) encryption. In an asymmetric encryption scheme, a private key is used to encrypt data while a public key is used to decrypt the data. Either of these keys may be referred to as an asymmetric key. In such a scheme, there is no requirement for the sender to trust the receiver, as is the case with a symmetric encryption scheme. The private key used in an asymmetric encryption scheme should be maintained with the utmost confidentiality. The public key, on the other hand, is known to the public, often through some type of certificate authority that provides a mapping between public keys and the identity of the owner of the corresponding private key.

The enterprise policy instructions that may be included in the authentication token may provide a way to communicate additional instructions to the TURN server 26 based on enterprise policies. According to some embodiments, these additional instructions may direct the TURN server 26 to record data relayed by the TURN server 26. This recorded data could be used to replay a video teleconference, provide debugging support, and/or to enforce security protocols, as non-limiting examples. In some embodiments, the enterprise policy instructions could direct the TURN server 26 to log information about the data relayed by the TURN server 26. This log information could include information about the requestor 22 that established the TURN server 26 relationship, the one or more clients connected to the TURN server 26 in order to communicate with the requestor 22, and/or other usage statistics such as time of use and bandwidth used as non-limiting examples. Some embodiments may provide that the enterprise policy instructions could direct the TURN server 26 to redirect the data relayed by the TURN server 26.

This redirection may be in response to a change in network topology or addressing, or to a security policy that affects the data being relayed by the TURN server 26. According to some embodiments disclosed herein, the enterprise policy instructions may also direct the TURN server 26 to fork the data relayed by the TURN server 26. Forking allows copies of the data to be provided to multiple destinations. One exemplary use of this feature would be to provide a multi-party WebRTC session. In order to reduce the number of connections maintained by the requestor 22 or some other client, the TURN server 26 could fork the data stream to multiple receiving clients. Another potential use of forking could be to record or archive all media interactions. These are merely non-limiting examples of enterprise policy instructions, and that other enterprise policy instructions providing other types of functionality may be implemented.

Figure 3:
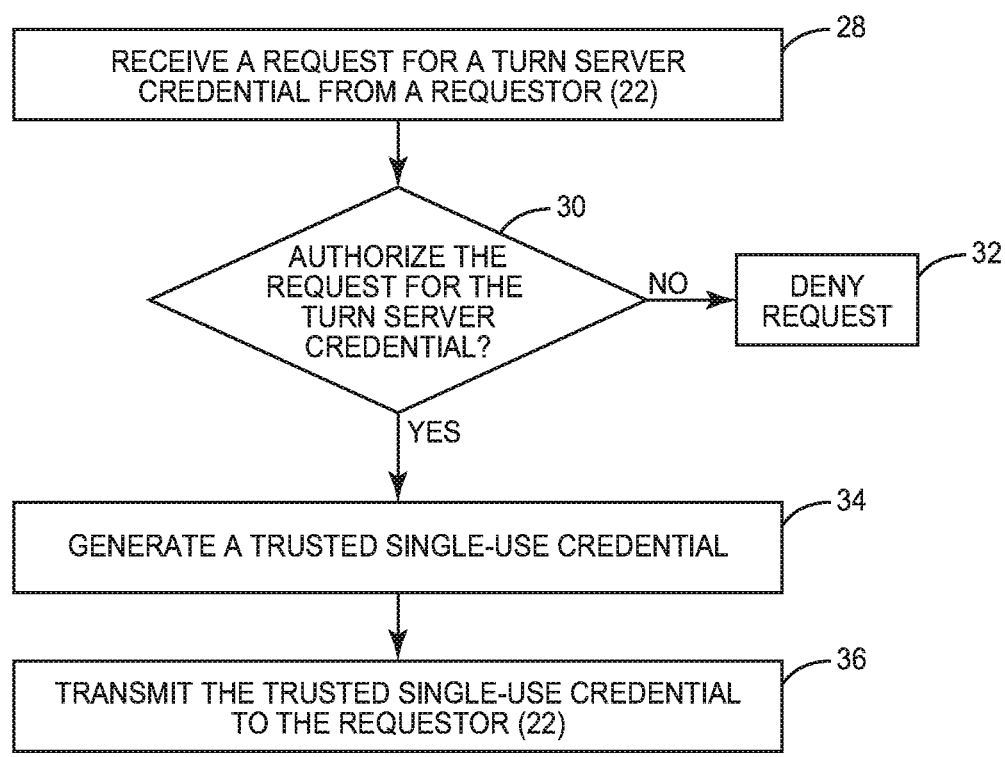
FIG. 3 is a flowchart illustrating exemplary functions of the TURN authentication agent of FIG. 2 for controlling access to a TURN server using trusted single-use credentials.

FIG. 3 is a flowchart illustrating exemplary functions of the TURN authentication agent 24 of FIG. 2 for controlling access to the TURN server 26 using trusted single-use credentials. Operations begin with the TURN authentication agent 24 receiving a request for a TURN server credential from the requestor 22 (block 28). In some embodiments, the requestor 22 makes this request in order to gain access to the TURN server 26. Next, the TURN authentication agent 24 determines whether to authorize the request for the TURN server credential (block 30). If the TURN authentication agent 24 determines at block 30 not to authorize the request, the TURN authentication agent 24 may either transmit a denial to the requestor 22, or may silently deny the request by not responding, depending on implementation of the TURN authentication agent 24 (block 32). On the other hand, if the TURN authentication agent 24 determines at block 30 to authorize the request, the TURN authentication agent 24 generates a trusted single-use credential (block 34). After the TURN authentication agent 24 generates the trusted single-use credential at block 34, the TURN authentication agent 24 transmits the trusted single-use credential to the requestor 22 (block 36).

Figure 4:
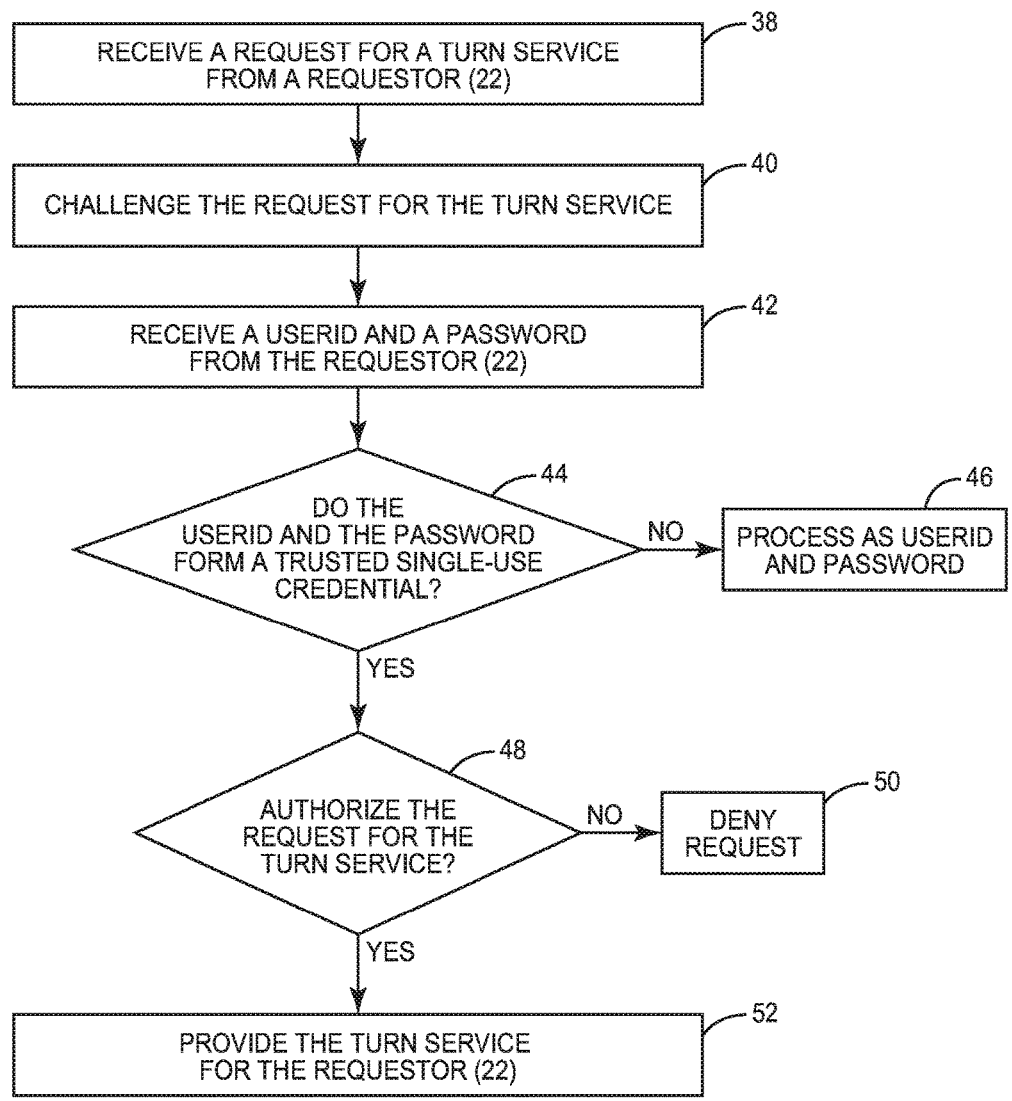
FIG. 4 is a flowchart illustrating exemplary functions of the TURN server of FIG. 2 for providing access to the TURN server using trusted single-use credentials.

Discussion now turns to the operation of the TURN server 26. In some embodiments, the TURN server 26 operates as described in RFC 5766 and various extensions thereof. This adherence to specification enables the TURN server 26 to be accessed via other standard methods, in addition to the methods described herein. In some embodiments, adherence to specification may not be required because the TURN server 26 is only required to operate according to one or more of the methods described herein. In this regard, FIG. 4 illustrates exemplary functions of the TURN server 26 in FIG. 2 for providing access to the TURN server 26 using trusted single-use credentials. Operations in FIG. 4 begin with the TURN server 26 receiving a request for a TURN service from a requestor 22 (block 38). The TURN server 26 then challenges the request for the TURN service (block 40). The purpose of this challenge may be, for example, to ensure that the requestor 22 is authorized to access the TURN server 26, as will be further discussed below. The TURN server 26 then receives a userid and password from the requestor 22 in response to the challenge (block 42). The TURN server 26 determines whether the userid and the password form a trusted single-use credential (block 44). If the TURN server 26 determines at block 44 that the userid and the password do not form a trusted single-use credential, the TURN server 26 may proceed to process the userid and the password in some other manner, such as userid/password digest authentication (block 46). If the TURN server 26 determines at block 34 that the userid and the password form a trusted single-use credential, the TURN server 26 then determines whether to authorize the request for the TURN service based on the trusted single-use credential (block 48). In some embodiments, this determination is made based on one or more values included in the trusted single-use credential. If the TURN server 26 determines at block 48 not to authorize the request for the TURN service, the TURN server 26 may either transmit a denial to the requestor 22 or silently deny the request by not responding, depending on implementation of the TURN server 26 (block 50). Conversely, if the TURN server 26 determines at block 38 to authorize the request for the TURN service, the TURN server 26 provides the TURN service for the requestor 22 (block 52). In some embodiments, the TURN service is a TURN server address allocation.

Figure 5:
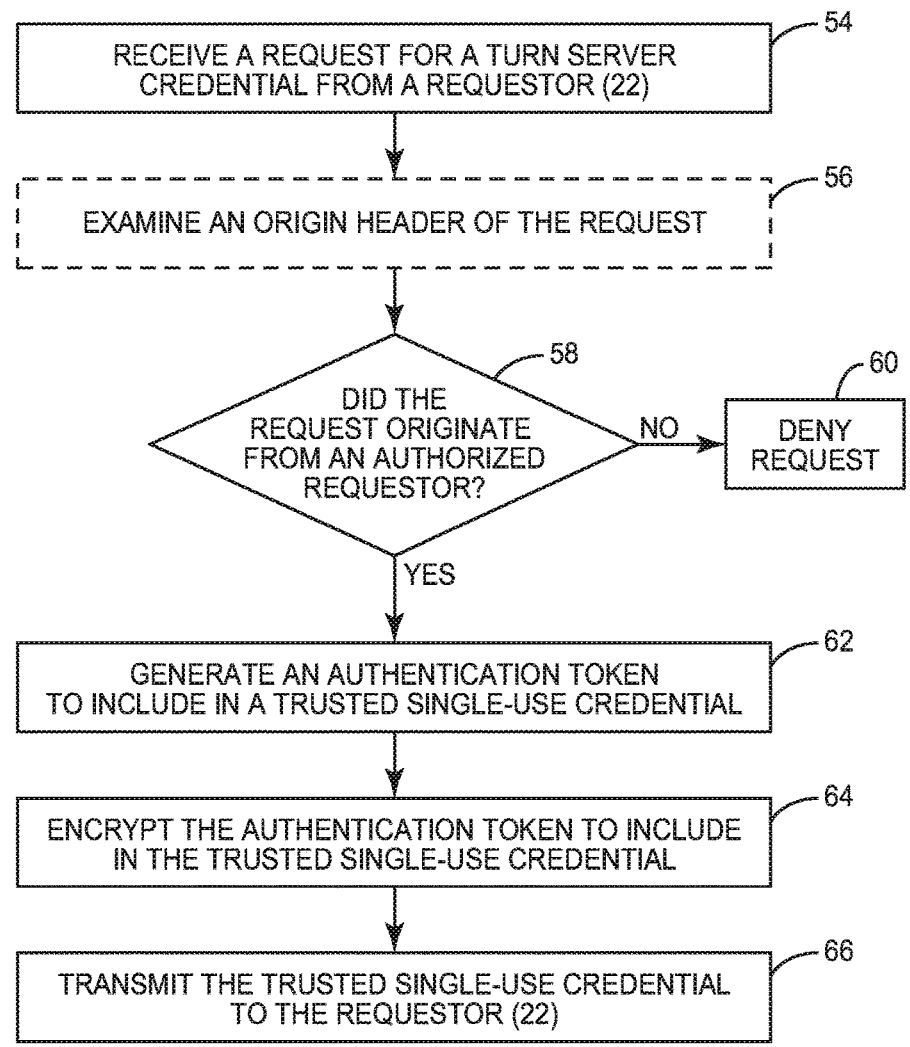
FIG. 5 is a flowchart illustrating more detailed exemplary functions of the TURN authentication agent of FIG. 2 for controlling access to a TURN server using trusted single-use credentials.

FIG. 5 is a flowchart illustrating more detailed exemplary functions of the TURN authentication agent 24 in FIG. 2 for controlling access to the TURN server 26 using trusted single-use credentials. As discussed above with relation to block 28 in FIG. 3, the TURN authentication agent 24 receives a request for a TURN server credential from a requestor 22 (block 54). The TURN authentication agent 24 next examines an origin header of the request (block 56) in some embodiments. The TURN authentication agent 24 then determines whether to authorize the request for the TURN server credential by determining whether the request originated from an authorized requestor (block 58). In some embodiments, this determination may include a comparison of the information in the origin header of the request with a list of authorized requestors according to one embodiment. The determination could also be made using any other suitable method, such as consulting a usage table to ensure that a usage quota for the requestor 22 has not been exceeded or querying another server or subsystem to determine if the requestor 22 is an authorized requestor.

If the TURN authentication agent 24 determines at block 58 not to authorize the request because the requestor 22 is not an authorized requestor, the TURN authentication agent 24 may deny the request (block 60). In some embodiments, denying the request may include transmitting a denial to the requestor 22, or may comprise silently denying the request by not responding. On the other hand, if the TURN authentication agent 24 determines at block 58 to authorize the request because the requestor 22 is an authorized requestor, the TURN authentication agent 24 generates an authentication token to include in a trusted single-use credential (block 62). Exemplary contents of the authentication token are described in detail above in relation to block 34 in the discussion of FIG. 3. After the TURN authentication agent 24 generates the authentication token to include in the trusted single-use credential, the TURN authentication agent 24 encrypts the authentication token to include in the trusted single-use credential (block 64). As noted above, this encryption may be accomplished using any symmetric or asymmetric encryption schemes. The TURN authentication agent 24 then transmits the trusted single-use credential to the requestor 22 as in block 36 of FIG. 3 (block 66).

Figure 6:
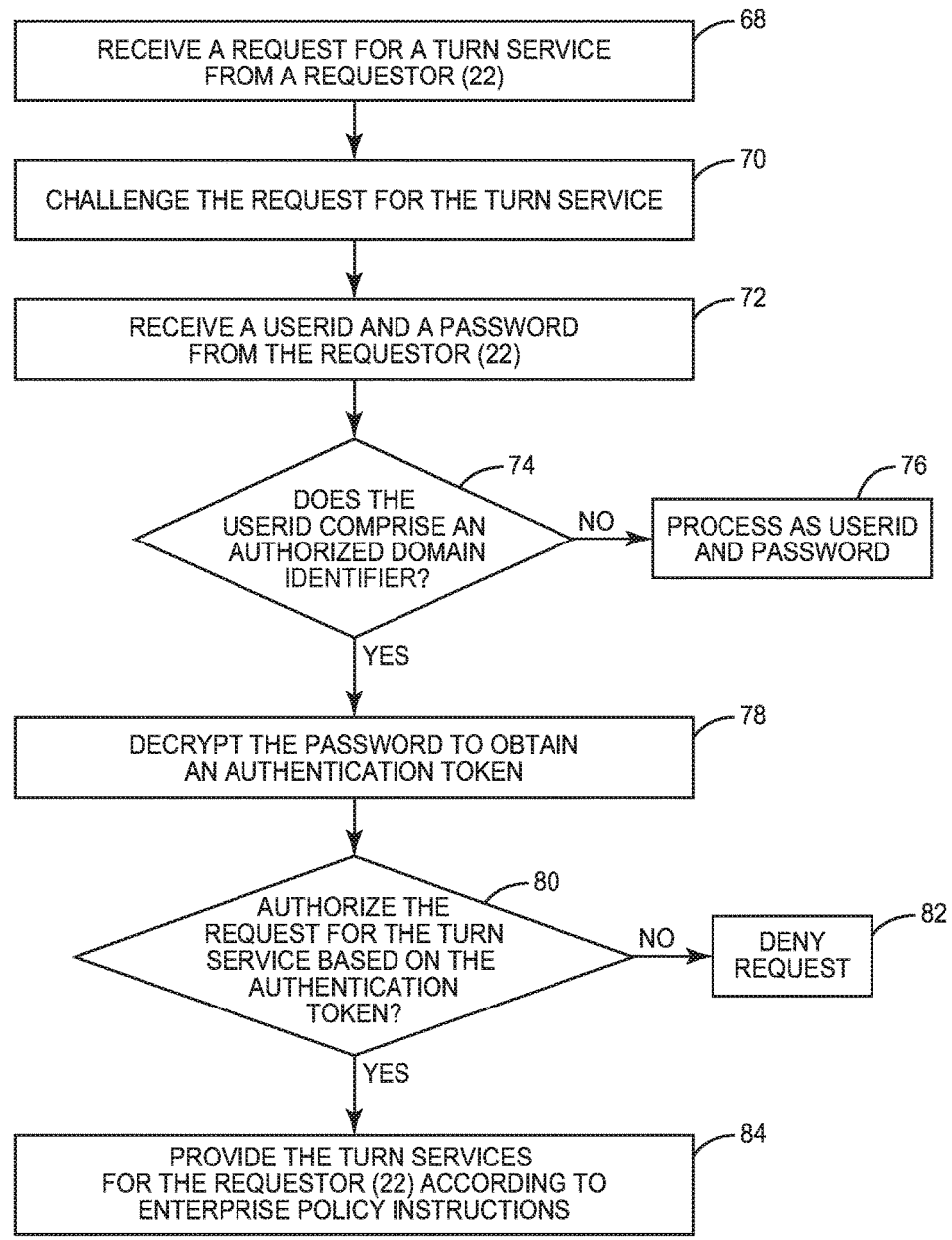
FIG. 6 is a flowchart illustrating more detailed exemplary functions of the TURN server of FIG. 2 for providing access to the TURN server using trusted single-use credentials.

FIG. 6 is a flowchart illustrating more detailed exemplary functions of the TURN server 26 in FIG. 2 for providing access to the TURN server 26 using trusted single-use credentials, according to another embodiment. As discussed above with relation to blocks 38-42 in FIG. 4, the TURN server 26 receives a request for a TURN service from a requestor 22 (block 68). The TURN server 26 then challenges the request for the TURN service (block 70). This challenge may be, for example, to ensure that the requestor 22 is authorized to access the TURN server 26, as will be discussed below. The TURN server 26 then receives a userid and a password from the requestor 22 in response to the challenge (block 72).

The TURN server 26 determines whether the userid and the password form a trusted single-use credential by determining if the userid comprises an authorized domain identifier (block 74). This determination may be made, for example, by comparing the userid with a list of authorized domain identifiers. The determination may also be made by querying another server or subsystem to determine if the userid comprises an authorized domain identifiers. If the TURN server 26 determines at block 74 that the userid does not comprise an authorized domain identifier, the TURN server 26 may proceed to process the userid and the password in some other manner such as userid/password digest authentication (block 76). However, if the TURN server 26 determines at block 74 that the userid comprises an authorized domain identifier, the TURN server 26 will process the userid and password as a trusted single-use credential. In this embodiment, the password contains an encrypted authentication token. The TURN server 26 decrypts the password to obtain an authentication token (block 78). As previously discussed, this decryption may be the reverse of a symmetric encryption scheme, such as a shared secret, or this decryption may be the reverse of an asymmetric encryption scheme such as PKI. In either case, the key used to decrypt the password received from the requestor 22 may be chosen based on the domain identifier in the userid received from the requestor 22. Since the TURN server 26 has already determined that the domain identifier is an authorized domain identifier, the TURN server 26 has access to a corresponding decryption key for that authorized domain identifier. The fact that the authentication token was encrypted with knowledge of the encryption key specific to the authorized domain identifier may be evidence authenticating the authorized domain identifier as the source of the information included in the authentication token.

The TURN server 26 then determines whether to authorize the request for the TURN service based on the authentication token (block 80). As previously discussed, the authentication token may include values such as a domain address, an expiration time stamp, a nonce value, a signature, and/or enterprise policy instructions. Values included in the authentication token may be used by the TURN server 26 to determine whether to authorize the request for the TURN service. For example, the TURN server 26 may check that the domain identifier matches the domain identifier received as the userid from the requestor 22. If the two domain identifier values do not match, the TURN server 26 should deny the request. Similarly, the TURN server 26 may examine the expiration timestamp to determine if the authentication token was created recently enough. If the expiration timestamp indicates that the authentication token has already expired, the TURN server 26 should deny the request. Likewise, the TURN server 26 may treat the nonce value as a cryptographic nonce. This value should be unique and should not have been processed by the TURN server 26 before. If the TURN server 26 determines that the nonce value has been processed before, the TURN server 26 should deny the request. Further, the signature that may be included in the authentication token may be used as an additional check that the authentication token was generated correctly. The signature could comprise an encrypted version of any value. For instance, the signature could include an encrypted version of the nonce value. This would allow the TURN server 26 to decrypt the signature and compare the result to the nonce value. Using the nonce value for the signature is more secure than using a value that does not change as frequently because the nonce value is less likely to be replicated as part of a replay attack, as an example.

If the TURN server 26 determines at block 80 not to authorize the request for the TURN service, the TURN server 26 may deny the request (block 82). In some embodiments, the TURN server 26 may deny the request by transmitting a denial to the requestor 22, or by silently denying the request by not responding. Conversely, if the TURN server 26 determines at block 80 to authorize the request for the TURN service, the TURN server 26 provides the TURN service for the requestor 22 according to the enterprise policy instructions that were included in the authentication token (block 84). According to some embodiments, the enterprise policy instructions may direct the TURN server 26 to record data relayed by the TURN server 26. This recorded data could be used to replay a video teleconference, provide debugging support, and/or to enforce security protocols, as non-limiting examples. In some embodiments, the enterprise policy instructions could direct the TURN server 26 to log information about the data relayed by the TURN server 26. This log information could include information about the requestor 22 that established the TURN server 26 relationship, the one or more clients connected to the TURN server 26 in order to communicate with the requestor 22, and/or other usage statistics such as time of use and bandwidth used as non-limiting examples. Some embodiments may provide that the enterprise policy instructions could direct the TURN server 26 to redirect the data relayed by the TURN server 26. This redirection may be in response to a change in network topology or addressing, or to a security policy that affects the data being relayed by the TURN server 26. According to some embodiments as disclosed herein, the enterprise policy instructions may also direct the TURN server 26 to fork the data relayed by the TURN server 26. Forking allows copies of the data to be provided to multiple destinations. One exemplary use of this feature would be to provide a multiparty WebRTC session. In order to reduce the number of connections maintained by the requestor 22 or some other client, the TURN server 26 could fork the data stream to multiple receiving clients. Another potential use of forking could be to record or archive all media interactions. These are merely non-limiting examples of enterprise policy instructions, and that other enterprise policy instructions providing other types of functionality may be implemented.

Figure 7:
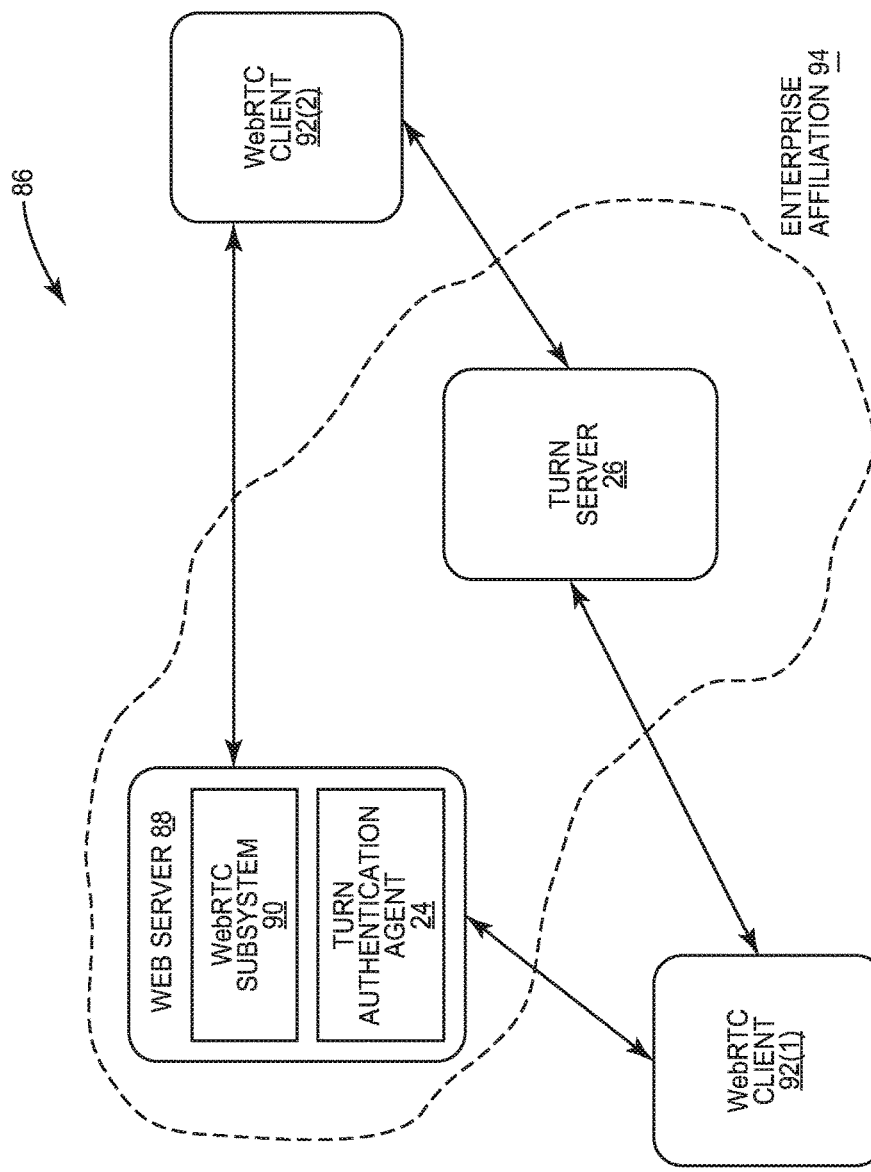
FIG. 7 is a block diagram of an exemplary TURN server authentication system including an enterprise-affiliated web server providing a WebRTC subsystem, and also including WebRTC clients.

FIG. 7 illustrates a TURN server authentication system 86 that incorporates the TURN authentication agent 24 and the TURN server 26 corresponding to the TURN authentication agent 24 and the TURN server 26, respectively, of FIGS. 2, 4, and 6. The TURN server authentication system 86 includes a web server 88 that contains a WebRTC subsystem 90. The TURN server authentication system 86 also includes WebRTC clients 92(1) and 92(2). In this embodiment, both the web server 88 and the TURN server 26 are part of an enterprise affiliation 94. As used herein, the term "enterprise affiliation" refers to an element being either owned or controlled by an enterprise, or to an element in a contractual relationship with the enterprise. In this exemplary TURN server authentication system 86, the web server 88 provides the WebRTC subsystem 90 to the various WebRTC clients 92. If one of the WebRTC clients 92 requires the use of the TURN server 26, the enterprise-affiliated web server 88 may provide access to the enterprise-affiliated TURN server 26 through the TURN authentication agent 24. In this embodiment, the WebRTC client 92(1) acts as a requestor 22, as discussed previously with relation to FIG. 2. In this embodiment, the web server 88 includes the TURN authentication agent 24, but the TURN authentication agent 24 in some embodiments could also be part of another enterprise-affiliated system. As discussed in detail in FIGS. 3 and 4, the WebRTC client 92(1), acting as the requestor 22, requests a TURN server credential from the TURN authentication agent 24. The WebRTC client 92(1) may then use the received single-use credential to gain access to the TURN server 26. In some embodiments, this process is facilitated by instructions received from the WebRTC subsystem 90. These instructions may be included, for example, in the JavaScript or HyperText Markup Language version 5 (HTML5) received by the WebRTC clients 92 when seeking to make a connection using the WebRTC subsystem 90.

Figure 8:
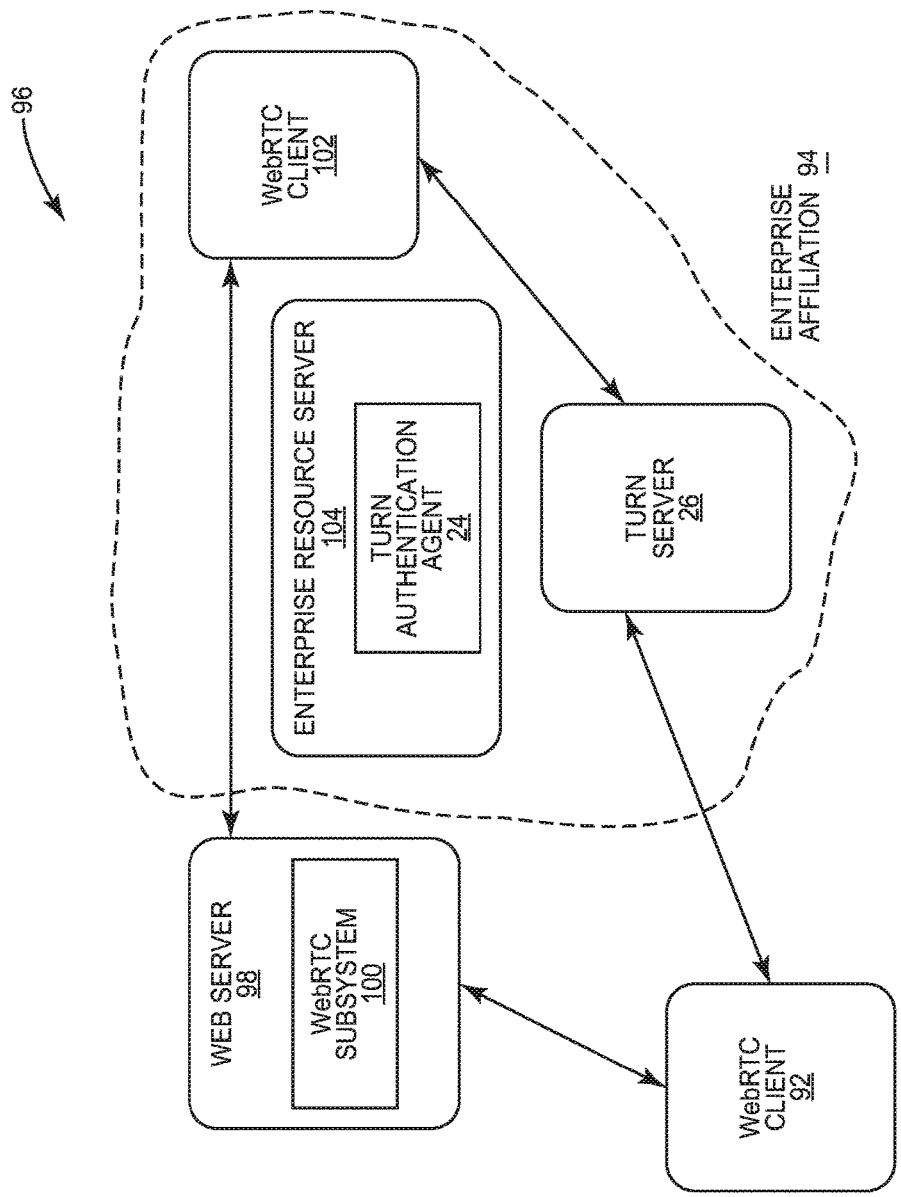
FIG. 8 is a block diagram of an exemplary TURN server authentication system including a non-enterprise-affiliated web server providing a WebRTC subsystem, and further including WebRTC clients.

FIG. 8 is a block diagram of another exemplary TURN server authentication system 96 incorporating a TURN authentication agent 24 and a TURN server 26 corresponding to the TURN authentication agent 24 and the TURN server 26, respectively, of FIGS. 2, 5, and 6. The TURN server authentication system 96 includes a web server 98 that contains a WebRTC subsystem 100, and also includes two WebRTC clients 92 and 102. In this embodiment, the TURN server 26 and the WebRTC client 102 are part of the enterprise affiliation 94, but the web server 98 is not part of the enterprise affiliation 94. Because of this, the web server 98 does not include the TURN authentication agent 24. Instead, an enterprise resource server 104 is provided as part of the enterprise affiliation 94. The enterprise resource server 104 includes the TURN authentication agent 24. In a manner similar to that of the exemplary TURN server authentication system 86 in FIG. 7, the two WebRTC clients 92 and 102 attempt to use the WebRTC subsystem 100 of the web server 98 to establish a WebRTC connection with one another. In this example, the enterprise-affiliated WebRTC client 102 requires the use of the TURN server 26. As discussed in detail in FIGS. 3 and 4, the WebRTC client 102, acting as a requestor 22, requests a TURN server credential from the TURN authentication agent 24 located on the enterprise-affiliated enterprise resource server 104. The WebRTC client 102 may then use the received single-use credential to gain access to the TURN server 26. In one embodiment, this process is facilitated by additional functionality included in the WebRTC client 102. This additional functionality may be included, for example, in a browser extension or other enterprise software included in or available to the enterprise-affiliated WebRTC client 102.

Figure 9:
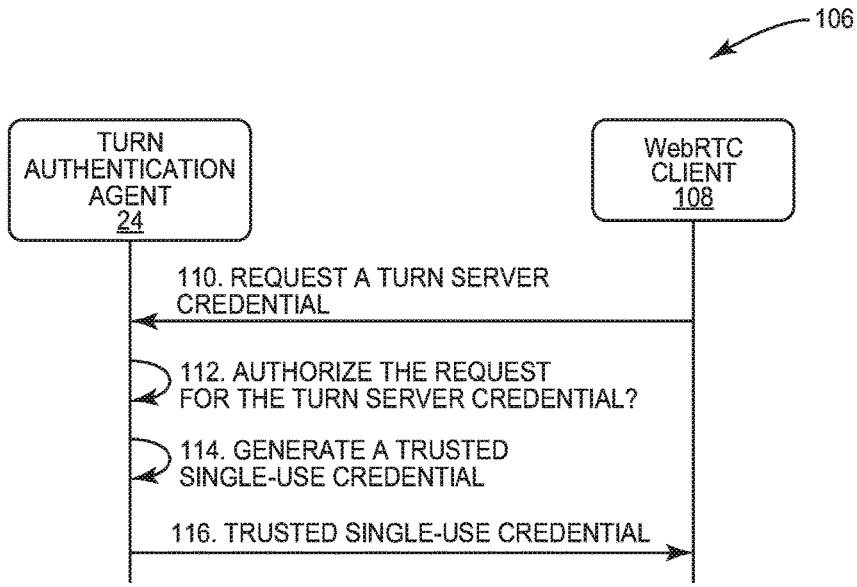
FIG. 9 illustrates exemplary communications flows within the TURN server authentication systems of FIGS. 7 and 8, in which a WebRTC client interacts with a TURN authentication agent.

FIG. 9 illustrates exemplary communications flows within a TURN server authentication system 106. According to some embodiments, the TURN server authentication system 106 can be either the TURN server authentication system 86 of FIG. 7 or the TURN server authentication system 96 of FIG. 8 in which a WebRTC client 108 interacts with the TURN authentication agent 24. The WebRTC client 108 can represent either the WebRTC client 92(1) as depicted in FIG. 7 or the WebRTC client 102 as depicted in FIG. 8. First, the WebRTC client 108 requests a TURN server credential from the TURN authentication agent 24, as indicated by arrow 110. Then, the TURN authentication agent 24 determines whether to authorize the request, as shown by arrow 112. In some embodiments, this determination can be based on whether or not the WebRTC client 108 is an authorized requestor. If the TURN authentication agent 24 determines to authorize the request, the TURN authentication agent 24 generates a trusted single-use credential as indicated by arrow 114. In some embodiments, the trusted single-use credential comprises an authentication token. The authentication token may include values such as a domain address, an expiration time stamp, a nonce value, a signature, and/or enterprise policy instructions as previously discussed. The TURN authentication agent 24 then transmits the trusted single-use credential to the WebRTC client 108, as shown by arrow 116.

Figure 10:
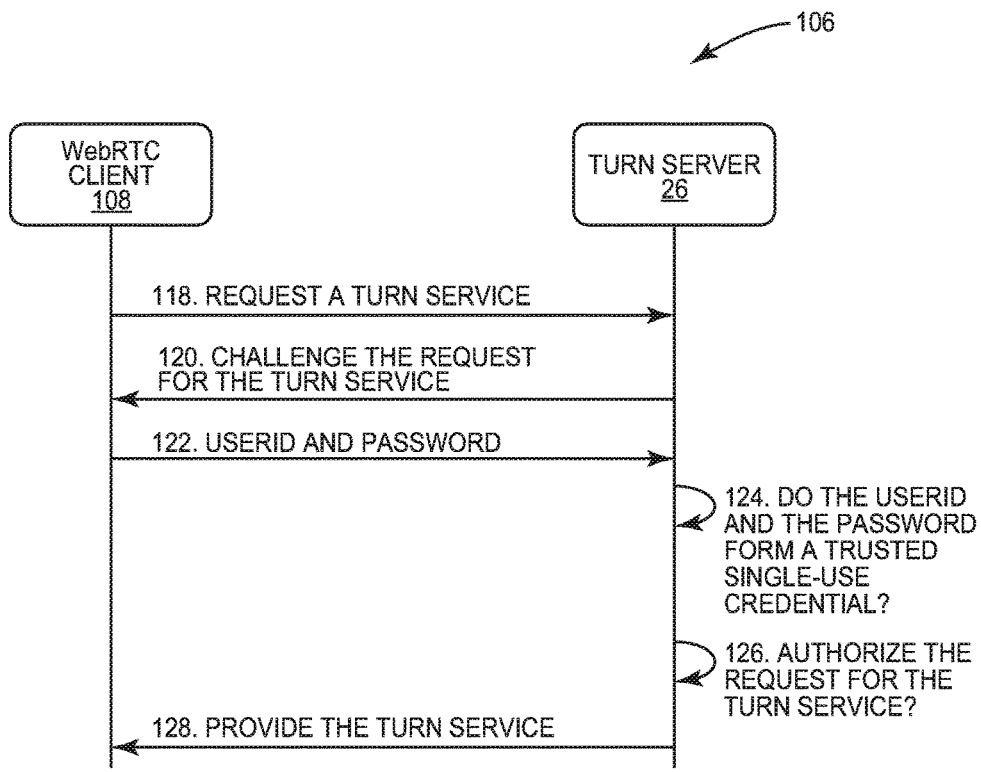
FIG. 10 illustrates exemplary communications flows within the TURN server authentication systems of FIGS. 7 and 8, in which a WebRTC client interacts with a TURN server.

FIG. 10 illustrates exemplary communications flows within the TURN server authentication system 106. FIG. 10 illustrates the operation of the TURN server authentication system 106, in which the WebRTC client 108 interacts with the TURN server 26. The WebRTC client 108 requests a TURN service from the TURN server 26 (arrow 118). The TURN server 26 challenges the request for the TURN service (arrow 120). The WebRTC client 108 responds to the challenge by providing a userid and password to the TURN server 26 (arrow 122). The TURN server 26 then determines if the userid and password form a trusted single-use credential (arrow 124). In some embodiments, the TURN server 26 determines whether the userid and the password form a trusted single-use credential by determining if the userid comprises an authorized domain identifier. If the userid and password form a trusted single-use credential, the TURN server 26 determines whether to authorize the request for the TURN service (arrow 126). In some embodiments, the password contains an encrypted authentication token. The TURN server 26 decrypts the password to obtain the authentication token. The TURN server 26 then determines whether to authorize the request for the TURN service based on the values included in the authentication token such as a domain address, an expiration time stamp, a nonce value, a signature, and/or enterprise policy instructions as previously discussed. If the TURN server 26 determines to authorize the request for the TURN service, the TURN server 26 provides the TURN service for the WebRTC client 108 (arrow 128).

Figure 11:
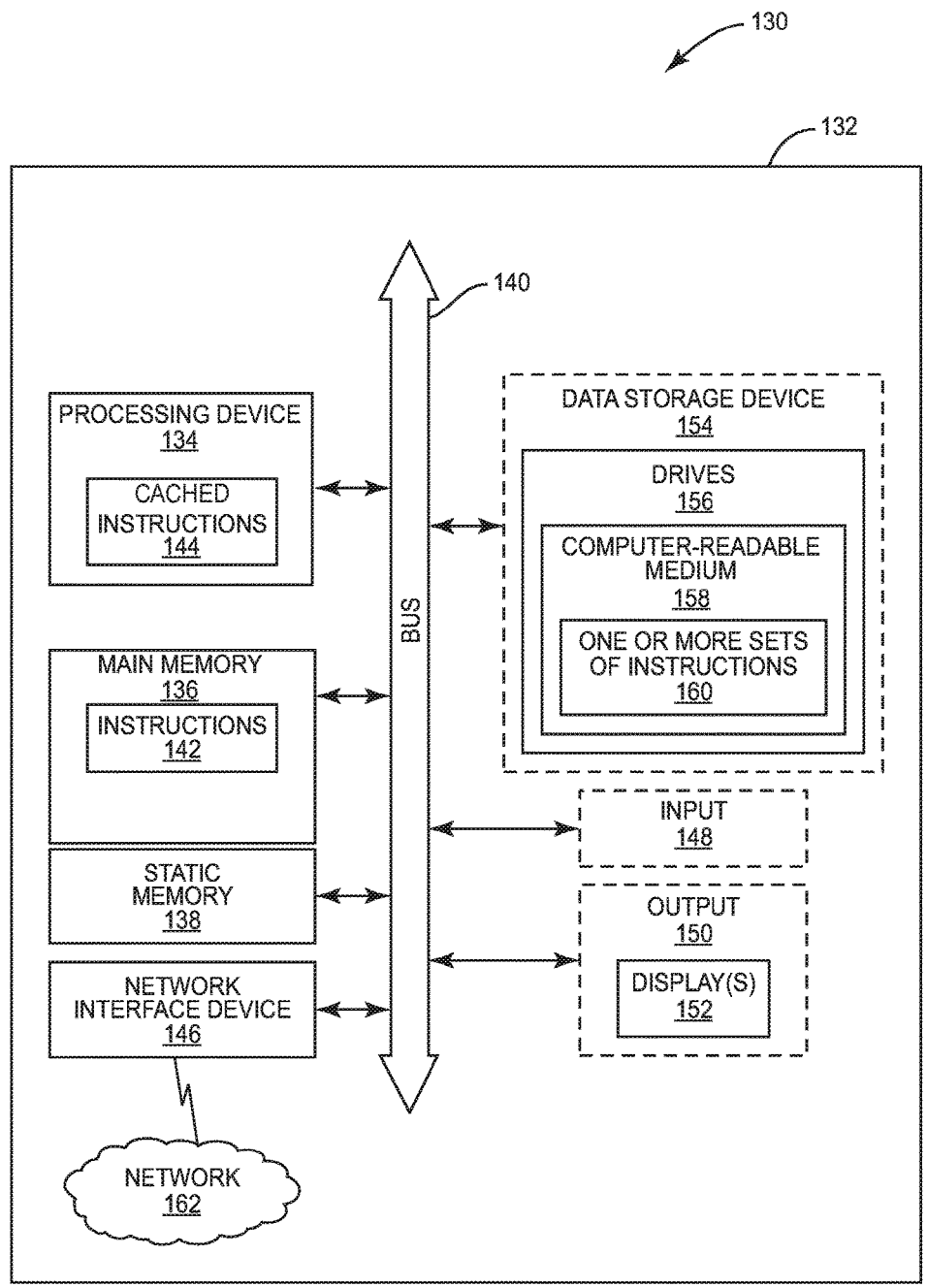
FIG. 11 is a block diagram of an exemplary processor-based system that can include the TURN server and the TURN authentication agent of FIGS. 2, 7, and 8.

FIG. 11 provides a block diagram representation of a processing system 130 in the exemplary form of an exemplary computer system 132 adapted to execute instructions to perform the functions described herein. In some embodiments, the processing system 130 may execute instructions to perform the functions of the TURN authentication agent 24 and/or the TURN server 26 of FIG. 2. In this regard, the processing system 130 may comprise the computer system 132, within which a set of instructions for causing the processing system 130 to perform any one or more of the methodologies discussed herein may be executed. The processing system 130 may be connected (as a non-limiting example, networked) to other machines in a local area network (LAN), an intranet, an extranet, or the Internet. The processing system 130 may operate in a client-server network environment, or as a peer machine in a peer-to-peer (or distributed) network environment. While only a single processing system 130 is illustrated, the terms "controller" and "server" shall also be taken to include any collection of machines that individually or jointly execute a set (or multiple sets) of instructions to perform any one or more of the methodologies discussed herein. The processing system 130 may be a server, a personal computer, a desktop computer, a laptop computer, a personal digital assistant (PDA), a computing pad, a mobile device, or any other device and may represent, as non-limiting examples, a server or a user's computer.

The exemplary computer system 132 includes a processing device or processor 134, a main memory 136 (as non-limiting examples, read-only memory (ROM), flash memory, dynamic random access memory (DRAM) such as synchronous DRAM (SDRAM), etc.), and a static memory 138 (as non-limiting examples, flash memory, static random access memory (SRAM), etc.), which may communicate with each other via a bus 140. Alternatively, the processing device 134 may be connected to the main memory 136 and/or the static memory 138 directly or via some other connectivity means.

The processing device 134 represents one or more processing devices such as a microprocessor, central processing unit (CPU), or the like. More particularly, the processing device 134 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 134 is configured to execute processing logic in instructions 142 and/or cached instructions 144 for performing the operations and steps discussed herein.

The computer system 132 may further include a communications interface in the form of a network interface device 146. The computer system 132 also may or may not include an input 148 to receive input and selections to be communicated to the computer system 132 when executing the instructions 142, 144. The computer system 132 also may or may not include an output 150, including but not limited to display(s) 152. The display(s) 152 may be a video display unit (as non-limiting examples, a liquid crystal display (LCD) or a cathode ray tube (CRT)), an alphanumeric input device (as a non-limiting example, a keyboard), a cursor control device (as a non-limiting example, a mouse), and/or a touch screen device (as a non-limiting example, a tablet input device or screen).

The computer system 132 may or may not include a data storage device 154 that includes using drive(s) 156 to store the functions described herein in a computer-readable medium 158, on which is stored one or more sets of instructions 160 (e.g., software) embodying any one or more of the methodologies or functions described herein. The functions can include the methods and/or other functions of the processing system 130, a participant user device, and/or a licensing server, as non-limiting examples. The one or more sets of instructions 160 may also reside, completely or at least partially, within the main memory 136 and/or within the processing device 134 during execution thereof by the computer system 132. The main memory 136 and the processing device 134 also constitute machine-accessible storage media. The instructions 142, 144, and/or 160 may further be transmitted or received over a network 162 via the network interface device 146. The network 162 may be an intra-network or an inter-network.

While the computer-readable medium 158 is shown in an exemplary embodiment to be a single medium, the term "machine-accessible storage medium" should be taken to include a single medium or multiple media (as non-limiting examples, a centralized or distributed database, and/or associated caches and servers) that store the one or more sets of instructions 160. The term "machine-accessible storage medium" shall also be taken to include any medium that is capable of storing, encoding, or carrying a set of instructions for execution by the machine, and that cause the machine to perform any one or more of the methodologies disclosed herein. The term "machine-accessible storage medium" shall accordingly be taken to include, but not be limited to, solid-state memories, and optical and magnetic media.

The embodiments disclosed herein may be embodied in hardware and in instructions that are stored in hardware, and may reside, as non-limiting examples, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a remote station. In the alternative, the processor and the storage medium may reside as discrete components in a remote station, base station, or server.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. As non-limiting examples, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for controlling access to a Traversal Using Relays around Network Address Translation (TURN) server, the method comprising:
   receiving, by the TURN server, a request from a Web Real-Time Communications (WebRTC) client for a TURN service;
   challenging, by the TURN server, the request for the TURN service;
   receiving, by the TURN server, a userid comprising an authorized domain identifier and a password comprising an encrypted authentication token from the WebRTC client, wherein the authentication token comprises enterprise policy instructions, wherein the authentication token was generated by a TURN authentication agent executing on a computing device in response to a determination by the TURN authentication agent to authorize a request for a TURN server credential from the WebRTC client;
   determining, by the TURN server, whether the userid comprises an authorized single-use credential by determining if the userid comprises the authorized domain identifier;

determining, by the TURN server, whether to authorize the request for the TURN service by decrypting the password to obtain the authentication token using a key based on the authorized domain identifier, wherein the authentication token comprises enterprise policy instructions; and responsive to determining whether to authorize the request for the TURN service, providing, by the TURN authentication agent, the TURN service for the WebRTC client according to the enterprise policy instructions.

2. The method of claim 1, further comprising determining that the request originated from an authorized requestor.

3. The method of claim 2, wherein determining that the request originated from the authorized requestor comprises examining an origin header of the request.

4. The method of claim 1, wherein the authentication token comprises a value selected from the group consisting of: a domain address; a nonce value; a signature; and the enterprise policy instructions.

5. The method of claim 1, wherein the authentication token was encrypted using a shared secret.

6. The method of claim 1, wherein the authentication token was encrypted using an asymmetric key.

7. A system for controlling access to a Traversal Using Relays around Network Address Translation (TURN) server, the system comprising:
a TURN server configured to:
receive a request from a Web Real-Time Communications (WebRTC) client for a TURN service;
challenge the request for the TURN service;
receive a userid comprising an authorized domain identifier and a password comprising an encrypted authentication token from the WebRTC client, wherein the authentication token comprises enterprise policy instructions, wherein the authentication token was generated by a TURN authentication agent executing on a computing device in response to a determination by the TURN authentication agent to authorize a request for a TURN server credential from the WebRTC client;
determine whether the userid comprises an authorized single-use credential by determining if the userid comprises the authorized domain identifier;
determine whether to authorize the request for the TURN by decrypting the password to obtain the authentication token using a key based on the authorized domain identifier, wherein the authentication token comprises enterprise policy instructions; and
responsive to determining whether to authorize the request for the TURN service, provide the TURN service for the WebRTC client according to the enterprise policy instructions.

8. The system of claim 7, wherein the authentication token comprises a value selected from the group consisting of: a domain address; a nonce value; a signature; and enterprise policy instructions.

9. The method of claim 7, further comprising determining that the request originated from an authorized requestor.

10. The method of claim 9, wherein determining that the request originated from the authorized requestor comprises examining an origin header of the request.

11. A non-transitory computer-readable medium storing one or more programs, the one or more programs comprising instructions, which when executed by an electronic device cause the electronic device to implement a method for controlling access to a Traversal Using Relays around Network Address Translation (TURN) server, the method comprising:

receiving, by the TURN server, a request from a Web Real-Time Communications (WebRTC) client for a TURN service;

challenging, by the TURN server, the request for the TURN service;

receiving, by the TURN server, a userid comprising an authorized domain identifier and a password comprising an encrypted authentication token from the WebRTC client, wherein the authentication token comprises enterprise policy instructions, wherein the authentication token was generated by a TURN authentication agent executing on a computing device in response to a determination by the TURN authentication agent to authorize a request for a TURN server credential from the WebRTC client;

determining, by the TURN server, whether the userid comprises an authorized single-use credential by determining if the userid comprises the authorized domain identifier;

determining, by the TURN server, whether to authorize the request for the TURN service by decrypting the password to obtain the authentication token using a key based on the authorized domain identifier, wherein the authentication token comprises enterprise policy instructions; and responsive to determining whether to authorize the request for the TURN service, providing, by the TURN authentication agent, the TURN service for the WebRTC client according to the enterprise policy instructions.

12. The non-transitory computer-readable medium of claim 11, wherein the authentication token was encrypted using a shared secret.

13. The non-transitory computer-readable medium of claim 11, wherein the authentication token was encrypted using an asymmetric key.

14. The system of claim 7, wherein the authentication token was encrypted using a shared secret.

15. The method of claim 7, wherein the authentication token was encrypted using an asymmetric key.

16. The non-transitory computer-readable medium of claim 11, wherein the authentication token comprises a value selected from the group consisting of: a domain address; a nonce value; a signature; and enterprise policy instructions.

17. The non-transitory computer-readable medium of claim 11, further comprising determining that the request originated from an authorized requestor.

18. The non-transitory computer-readable medium of claim 17, wherein determining that the request originated from the authorized requestor comprises examining an origin header of the request.

* * * * *